(12) United States Patent
Trefz et al.

(10) Patent No.: US 6,543,560 B1
(45) Date of Patent: Apr. 8, 2003

(54) HYDROSTATIC TRANSMISSION WITH INTEGRAL ACTUATOR

(75) Inventors: Harlin J. Trefz, Jackson, TN (US); Ted Wetzel, Mayfield, OH (US)

(73) Assignee: Delta Systems, Inc., Streetsboro, OH (US)

(*) Notice: Subject to any disclaimer, the term of this patent is extended or adjusted under 35 U.S.C. 154(b) by 0 days.

(21) Appl. No.: 09/618,697

(22) Filed: Jul. 18, 2000

(51) Int. Cl.⁷ .................. B60K 17/28; B60K 17/00; F16D 31/02
(52) U.S. Cl. .................. 180/53.4; 180/53.5; 180/305; 60/484
(58) Field of Search .................. 180/53.4, 305, 180/53.1, 53.5; 60/488, 484

(56) References Cited

U.S. PATENT DOCUMENTS

| | | |
|---|---|---|
| 2,474,706 A | 6/1949 | Wahlmark |
| 3,063,225 A | 11/1962 | Barrentine |
| RE27,307 E | 3/1972 | De Lalio |
| 3,739,578 A | 6/1973 | Roeske |
| 3,898,807 A | 8/1975 | Habiger |

(List continued on next page.)

FOREIGN PATENT DOCUMENTS

| | | | |
|---|---|---|---|
| EP | 0053558 A1 | * 9/1982 | ............ F02M/3/06 |
| JP | 2102829 A | * 4/1990 | ........... B60K/25/04 |

OTHER PUBLICATIONS

John Deere 790 Compact Utility Tractor Advertisement, date unknown (1 page).
John Deere 790 Compact Utility Tractor Service Manual (1991) pp. 255-15-3; 270-10-3; 70-10-7; 70-11-16; 270-05-7; 70-10-6; 270-10-37.
John Deere 4200, 4300 and 4400 Compact Utility Tractor Advertisement, date unknown (1 page).
John Deere 4200-4300-4400 Compact Utility Tractor Service Manual (2001, earlier versions of manual believed to exist) pp. 6-7; 8-18; 11-7 and 11-6.

(List continued on next page.)

Primary Examiner—Paul N. Dickson
Assistant Examiner—Joselynn Y Sliteris
(74) Attorney, Agent, or Firm—Watts, Hoffmann, Fisher & Heinke Co., L.P.A.

(57) ABSTRACT

A hydrostatic transmission with an integral actuator for a vehicle having an engine and a frame. The assembly includes a transmission housing for connection to a vehicle frame, a shaft for coupling the hydrostatic transmission to an output of a vehicle engine, a pump driven by the shaft and an actuator operatively coupled to the pump that is attached to the transmission housing.

16 Claims, 8 Drawing Sheets

U.S. PATENT DOCUMENTS

| | | | |
|---|---|---|---|
| 3,923,129 A | * 12/1975 | Rusch et al. | 192/219 |
| 3,986,358 A | * 10/1976 | Hoffmann | 60/431 |
| 4,041,702 A | 8/1977 | Habiger | |
| 4,041,703 A | * 8/1977 | Knapp | 417/216 |
| 4,096,768 A | 6/1978 | Miyao | |
| 4,167,855 A | 9/1979 | Knapp | |
| 4,178,741 A | 12/1979 | Lonn et al. | |
| 4,189,921 A | 2/1980 | Knapp | |
| 4,522,553 A | 6/1985 | Nelson et al. | |
| 4,541,229 A | 9/1985 | Elijah | |
| 4,567,971 A | * 2/1986 | Hille et al. | 192/109 F |
| 4,613,024 A | * 9/1986 | Inkura et al. | 192/12 C |
| 4,643,442 A | * 2/1987 | Ohashi et al. | 172/439 |
| 4,669,361 A | * 6/1987 | Ito et al. | 137/907 |
| 4,673,055 A | 6/1987 | Yamoaka et al. | |
| 4,756,234 A | * 7/1988 | Anderson | 180/178 |
| 4,864,805 A | 9/1989 | Hager et al. | |
| 4,864,823 A | 9/1989 | Ikejiri et al. | |
| 4,878,338 A | 11/1989 | Aldred et al. | |
| 4,899,542 A | 2/1990 | Iino et al. | |
| 4,901,685 A | 2/1990 | Fukuo et al. | |
| 4,932,208 A | 6/1990 | Koyama et al. | |
| 4,944,201 A | 7/1990 | Iino et al. | |
| 4,951,462 A | 8/1990 | Graf | |
| 4,974,400 A | 12/1990 | Chubey et al. | |
| 5,045,035 A | 9/1991 | Ganoung | |
| 5,048,273 A | 9/1991 | Orsborn et al. | |
| 5,060,476 A | 10/1991 | Yamaguchi et al. | |
| 5,108,267 A | 4/1992 | Horst | |
| 5,133,174 A | 7/1992 | Parsons, Jr. | |
| 5,249,474 A | * 10/1993 | Gregory | 74/15.66 |
| 5,311,740 A | 5/1994 | Shiba et al. | |
| 5,325,650 A | 7/1994 | Fuse et al. | |
| 5,335,487 A | * 8/1994 | Murakawa et al. | 56/10.5 |
| 5,517,809 A | 5/1996 | Rich | |
| 5,518,079 A | 5/1996 | Zvolanek | |
| 5,622,051 A | * 4/1997 | Iida et al. | 60/456 |
| 5,701,739 A | * 12/1997 | Ohashi et al. | 60/453 |
| 5,755,098 A | * 5/1998 | Irikura | 180/53.1 |
| 5,918,449 A | 7/1999 | Rush et al. | |
| 5,937,697 A | * 8/1999 | Matsufuji | 180/53.1 |
| 6,007,444 A | 12/1999 | Kinokami | |
| 6,119,552 A | 9/2000 | Matsufuji | |
| 6,125,961 A | 10/2000 | Matsufuji | |
| 6,199,380 B1 | * 3/2001 | Ishii | 60/485 |

* cited by examiner

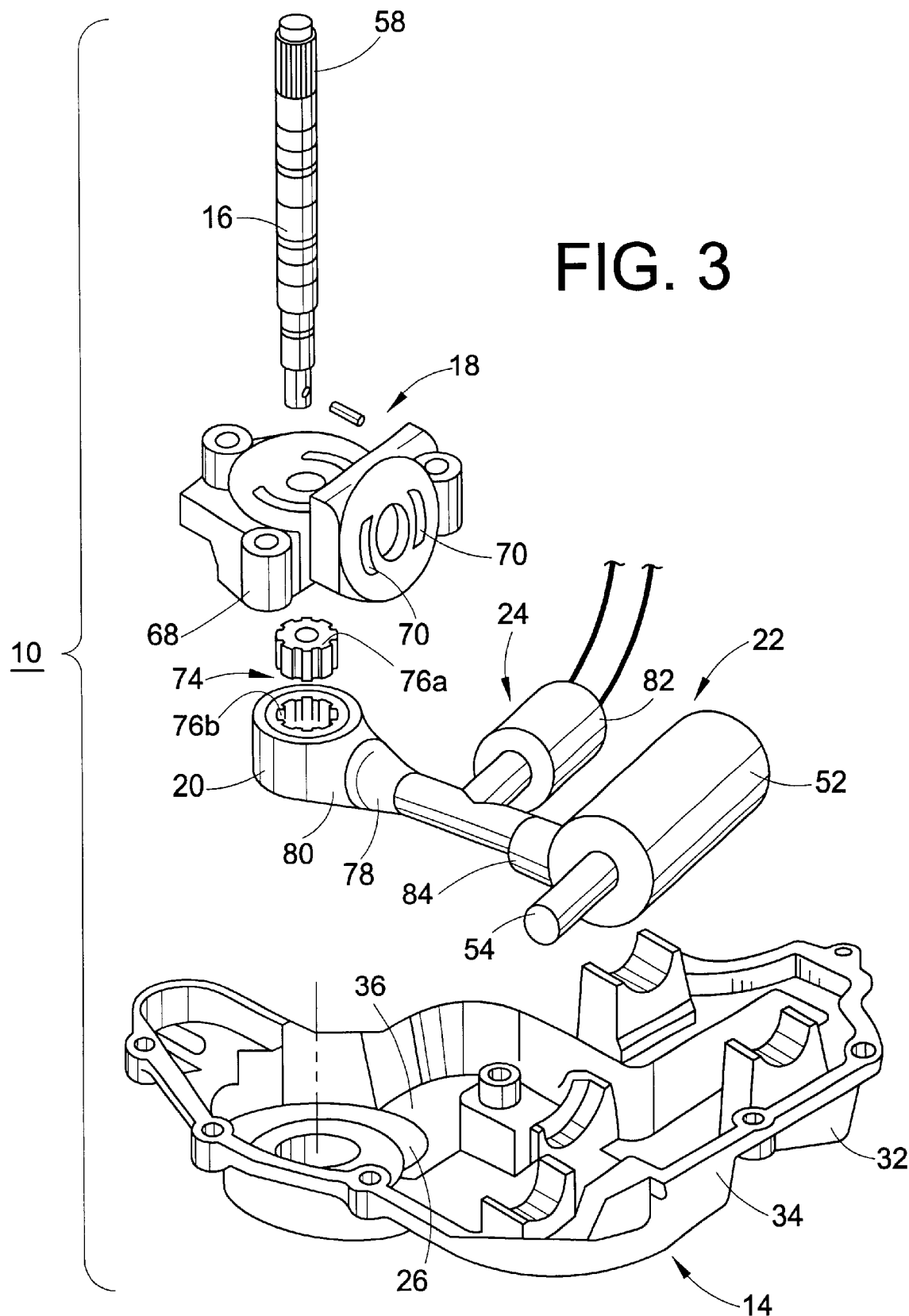

HYDROSTATIC TRANSMISSION WITH INTEGRAL ACTUATOR

TECHNICAL FIELD

The present invention relates to a hydrostatic transmission for use in a vehicle and, more particularly, the present invention relates to a hydrostatic transmission with an integral actuator.

BACKGROUND ART

It is common in the prior art to propel a vehicle with a hydrostatic transmission. An output shaft of a vehicle engine is coupled to a shaft of a pump of a hydrostatic transmission. The pump is typically encased in a hydrostatic transmission housing and is at least partially submerged in a bath of hydrostatic fluid. Rotation of the shaft of the pump by the motor output shaft produces a flow of hydrostatic fluid from the pump. The flow of hydrostatic fluid from the pump is coupled to a hydrostatic motor which propels one or more of the wheels of the vehicle. The flow of the hydrostatic fluid from the pump to the hydrostatic motor is regulated to control the speed and direction of rotation of the one or more drive wheels of the vehicle.

U.S. Pat. No. 4,878,338 to Aldred et al. discloses a grass cutting machine that includes an A-frame chassis supported by two front wheels and a rear wheel. The chassis carries a conventional diesel engine which provides the traction drive for the machine through front wheels via a hydrostatic transmission. U.S. Pat. No. 5,518,079 to Zvolanek discloses a lawn mower having an engine that is coupled to left and right pumps that correspond to left and right rear wheels of the lawn mower. The left and right pumps produce a flow of fluid that is communicated to left and right wheel motors. Selective control of the fluid from the left and right pumps to the left and right wheel motors controls the movement of the lawn mower.

It is also known in the prior art to drive cutting blades of a mowing unit with hydraulic fluid. For example, U.S. Pat. No. 5,133,174 to Parsons, Jr. discloses the rotation of pumps in fluid pumping units with a power take-off of a tractor to produce fluid pressure. The pressure generated by the fluid pumping units is selectively communicated to fluid drive motors by solenoid valves. The fluid drive motors drive the cutters of the mowing unit. The driver of the mowing unit may actuate one or more of the solenoid valves to actuate one or more of the cutters of the mowing unit.

U.S. Pat. No. 4,178,741 to Lonn et al. discloses a riding mower having a propulsion means, a seat for the operator and at least one cutting head that is hydraulically driven. The cutting head is controllable between an operating norm and a non-operating norm by means of a hydraulic valve having two movable spools, and the cutting head is movable between a cutting position and a transport position by means of a hydraulic cylinder. A solenoid valve is employed to control one of the movable spools.

U.S. Pat. No. 4,878,338 to Aldred et al. describes a grass cutting machine with two forward cutting units of the reel type supported from the chassis on respective support arms, each pivotally mounted with respect to the chassis on an axle. Each cutting unit is provided with a hydraulic drive motor that receives hydraulic fluid through lines.

It is also known in the prior art to selectively engage a power take-off using a vacuum actuator. For example, U.S. Pat. No. 5,918,449 to Rush et al. discloses a control system for controlling an associated device that includes a vacuum actuator, a connecting means for operatively connecting the vacuum actuator to the associated device, a vacuum means for providing a vacuum to the vacuum actuator, and activating means for selectively electrically activating the vacuum actuator. To engage an associated PTO shaft, an operator switches an electric switch,, opening a control valve and activating a vacuum actuator. Next, a clutch arm is pivoted, causing a braking arm to take a PTO pulley out of breaking engagement and forcing an idler pulley into operative engagement with the PTO belt. This connects the PTO pulley with a drive pulley thereby rotating the PTO shaft. When the PTO is to be disengaged, the brake arm is effective to stop the motion of the implement driven by the PTO, and to stop the implement within a very short time.

DISCLOSURE OF INVENTION

The present invention concerns a hydrostatic transmission with an integral actuator for a vehicle having an engine or motor and a frame. The hydrostatic transmission with integral actuator includes a transmission housing that is connected to the vehicle frame. A transmission shaft that is adapted to be coupled to an output of the engine extends into the transmission housing. First and second pumps disposed in the housing are connected to the shaft. Rotation of the shaft produces a flow of fluid from each of the first and second pumps. The flow of fluid from the first pump is used to propel the vehicle. An actuator is at least partially contained within the housing and is coupled to the second pump. A valve is operably connected to either the second pump or the actuator or both the second pump and the actuator. Operation of the valve selectively communicates fluid pressure to the actuator to extend and retract the actuator.

The hydrostatic transmission with integral actuator may include a spring connected to the actuator that biases the actuator to a first position when the valve is closed. The spring may be enclosed in the housing of the actuator or may be external to a housing of the actuator. The valve, which may be a solenoid valve, may be enclosed in the transmission housing.

The integral actuator is extended and retracted by coupling the transmission shaft to the engine. The transmission shaft is coupled to a pump to create fluid pressure in the pump. Fluid pressure is selectively communicated from the pump to the integral actuator to selectively extend and retract a portion of the integral actuator that extends from the transmission housing. The pressure is selectively communicated from the pump to the integral actuator by opening a valve. The integral actuator of a first embodiment is extended by communicating fluid pressure to the integral actuator. An integral actuator of a second embodiment is retracted by communicating fluid pressure to the integral actuator.

The hydrostatic transmission with integral actuator may be used to engage a PTO shaft. A vehicle having a body, an engine, a hydrostatic transmission with an integral actuator, and a PTO shaft, is provided. Fluid pressure is selectively communicated to the integral actuator to engage the PTO shaft. A connector link may be connected to the integral actuator and operably connected to a PTO, such that movement of the integral actuator from a first position to a second position engages the PTO.

The hydrostatic transmission with integral actuator provides a cost effective means for controlling a variety of implements of a lawn and garden tractor. The self-contained nature of the actuator of the hydrostatic transmission increases the life of the actuator, since those portions of the actuator within the transmission housing are not exposed to the environment. The internal actuator of the hydrostatic transmission eliminates the need for hoses that carry hydrostatic fluid from a source of hydrostatic fluid to a distant external actuator. The implements of a lawn and garden tractor may be conveniently connected to the integral actuator by linkages or cables.

Additional features of the invention will become apparent and a fuller understanding will be obtained by reading the following detailed description in connection with the accompanying drawings.

BRIEF DESCRIPTION OF DRAWINGS

FIG. 3 is an exploded perspective view of a hydrostatic transmission with integral actuator of the present invention (shown without a top half of a housing);

BEST MODE FOR CARRYING OUT THE INVENTION

Figure 1A:
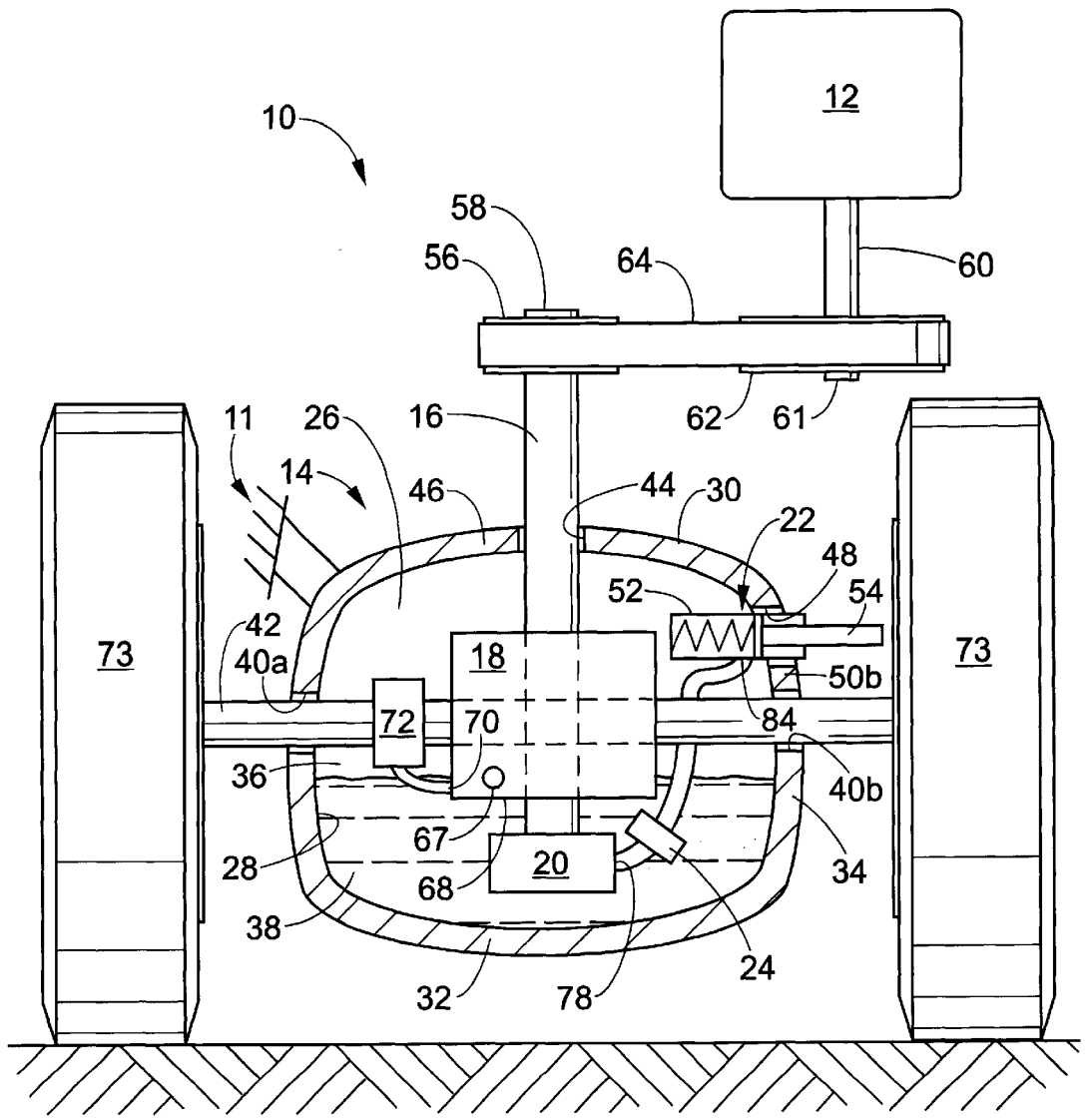
FIG. 1A is a schematic representation of a hydrostatic transmission with an integral actuator shown in an extended position.

The present invention is directed to a hydrostatic transmission 10 having an integral actuator 22 for a vehicle having an engine 12 or motor and a frame 11. The hydrostatic transmission 10 having an integral actuator 22 includes a transmission housing 14, a transmission shaft 16, a drive pump 18, an actuator pump 20, a fluid driven actuator 22, and an actuator valve 24. The transmission housing 14 is adapted for connection to the frame of a vehicle. The transmission shaft 16 extends from a cavity 26 defined by walls 28 of the transmission housing 14. The transmission shaft 16 is coupled to the engine 12. In the exemplary embodiment, an internal combustion engine is used. In an alternate embodiment, an electric motor is used. The drive pump 18 is disposed in the transmission housing and is connected to the transmission shaft 16. Rotation of the transmission shaft 16 produces a flow of fluid from the drive pump 18 that is regulated to control motion of the vehicle. The actuator pump 20 is also connected to the transmission shaft 16 so that rotation of the transmission shaft 16 produces a flow of fluid from the actuator pump. In the exemplary embodiment, the fluid driven actuator 22 is at least partially contained within the transmission housing 14 and is coupled to the actuator pump 20. In an alternate embodiment, the fluid driven actuator is connected to an outer surface of the transmission housing. The actuator valve 24 is interposed between the actuator pump 20 and the fluid driven actuator 22 for selectively extending and retracting the actuator 22.

Figure 2C:
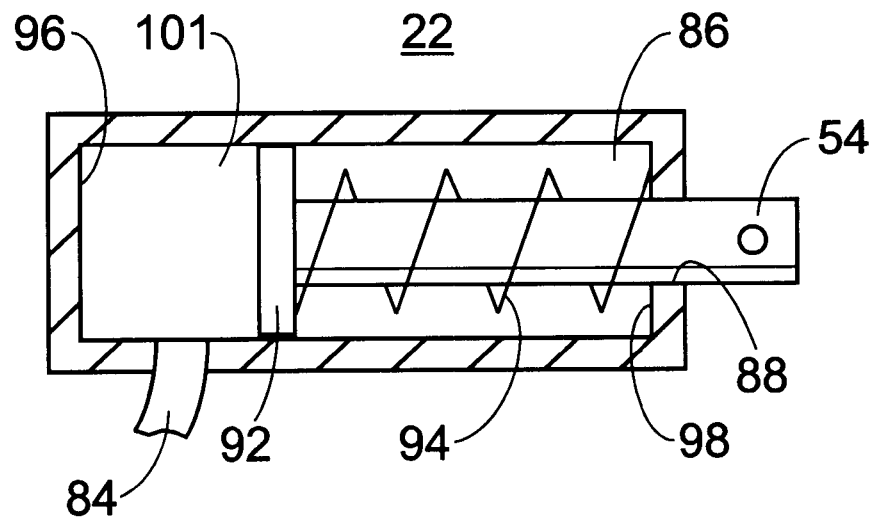
FIG. 2C is a schematic representation of an actuator shown in a retracted position.
Figure 2A:
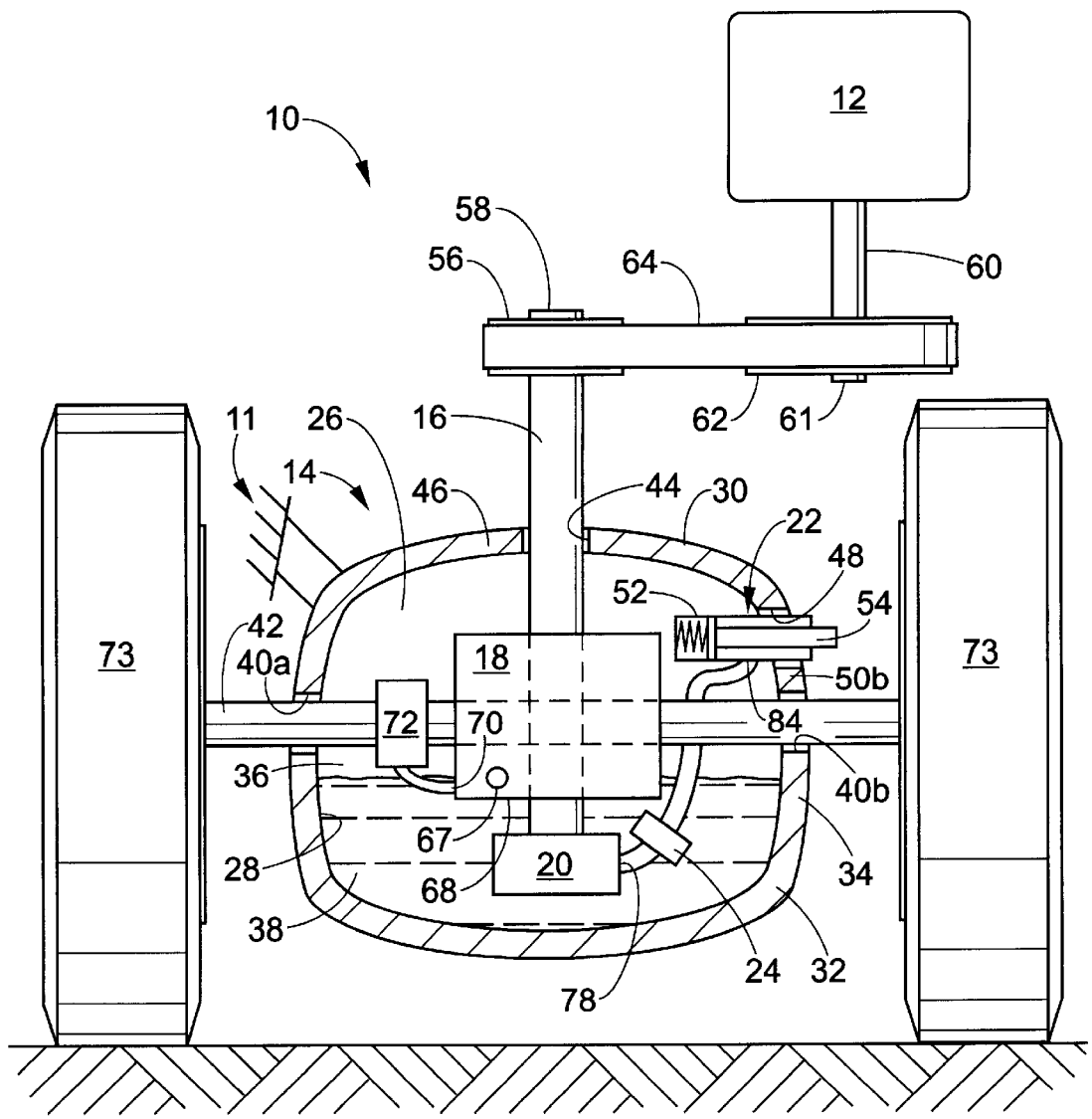
FIG. 2A is a schematic representation of a hydrostatic transmission with an integral actuator shown in a retracted position.

Referring to FIGS. 1A and 2A, the transmission housing 14 includes an upper half 30 and a lower half 32. The lower half 32 of the transmission housing is fluid tight. The volume defined by the walls 34 of the lower half 32 of the transmission housing 14 defines a reservoir 36 that contains hydrostatic fluid 38. The lower half 32 of the transmission housing 14 includes openings 40a, 40b that accommodate a vehicle axle 42. In an alternate embodiment (not shown), the openings 40a, 40b for the axle 42 are in the upper half 30 of the transmission housing 14. In the exemplary embodiment, fluid tight seals are formed in the openings 40a, 40b around the axle 42, preventing hydrostatic fluid 38 from leaking out of the transmission housing 14 and preventing debris from entering the transmission housing.

Referring to FIGS. 1A and 2A, the upper half 30 of the transmission housing 14 is connected to the lower half 32 to form a sealed transmission housing 14. The top 46 of the upper half 30 of the transmission housing 14 includes an opening 44 for the transmission shaft 16. In the exemplary embodiment, a seal is formed around the transmission shaft 16 in the opening 44 in the upper half 30. The seal around the transmission shaft inhibits hydrostatic fluid from leaving the housing 14 and prevents contaminants from entering the housing.

In the exemplary embodiment, a side 50b of the upper half 30 includes an opening 48 for the fluid driven actuator 22. The opening 48 for the actuator is sized to accommodate a body 52 of the actuator 22. In an alternate embodiment, the opening 48 for the actuator 22 is sized to fit around an actuator shaft 54. A seal is formed around the portion of the actuator that extends through the side 50b of the upper half 30 of the transmission housing 14. The seal around the portion of the actuator that extends through the housing 14 prevents hydrostatic fluid from leaking out of the housing and prevents contaminants from entering the housing.

Referring to FIGS. 1A and 2A, the transmission shaft 16 extends through the opening 44 in the top 46 of the upper half 30 of the transmission housing 14. A pulley 56 is connected to an end 58 of the transmission shaft 16. The vehicle engine 12 includes an output shaft 60 having a pulley 62 connected to one end 61. A belt 64 couples the engine pulley 62 to the transmission pulley 56, such that rotation of the output shaft 60 of the engine 12 causes rotation of the transmission input shaft 16.

Referring to FIGS. 1A and 2A, the drive pump 18 is connected to the transmission shaft 16. In the exemplary embodiment, the drive pump 18 is at least partially submerged in the hydrostatic fluid 38 in the reservoir 36. In the exemplary embodiment, rotation of the transmission shaft 16 causes hydrostatic fluid 38 to be siphoned into a drive pump inlet 67 that is located near a bottom 68 of the pump 18. The hydrostatic fluid 38 siphoned into the drive pump 18 is forced out fluid outlets 70 of the drive pump 18 (best shown in FIG. 3) at high pressure. The high pressure flow of hydrostatic fluid from the drive pump 18 is regulated in a manner well known in the art to selectively communicate the fluid under pressure to a hydrostatic motor 72. The hydrostatic motor 72 is coupled to the axle 42 in a manner well known in the art. Rotation of the hydrostatic motor 72 causes a corresponding rotation of the axle 42, which drives the wheels 73 of the vehicle.

One hydrostatic transmission that may be utilized in accordance with the present invention is model no. K62 produced by Tuff Torq. The drive pump 18, hydrostatic motor 72, gearing and axle 42 of the exemplary embodiment are the same as those used in model no. K62 produced by Tuff Torq. The transmission shaft 16 and transmission housing 14 of the exemplary embodiment are similar to those used in Tuff Torq's model no. K62. However, the transmission shaft 16 of the exemplary embodiment is longer than the transmission shaft of the Tuff Torq transmission, allowing attachment of the second pump 20. The bottom half 32 of the transmission housing 14 of the exemplary embodiment is larger than the Tuff Torq transmission housing, accommodating the actuator pump 20. It should be readily apparent to those skilled in the art that any suitable hydrostatic transmission housing may be modified to construct a hydrostatic transmission with integral actuator of the present invention.

In the exemplary embodiment, the actuator pump 20 is coupled to the transmission shaft 16 below the drive pump 18. In the exemplary embodiment, the actuator pump 20 is completely submerged in the hydrostatic fluid 38 in the reservoir 36. It should be readily apparent that the actuator pump may be connected to the transmission shaft 16 above the drive pump 18.

Figure 5:
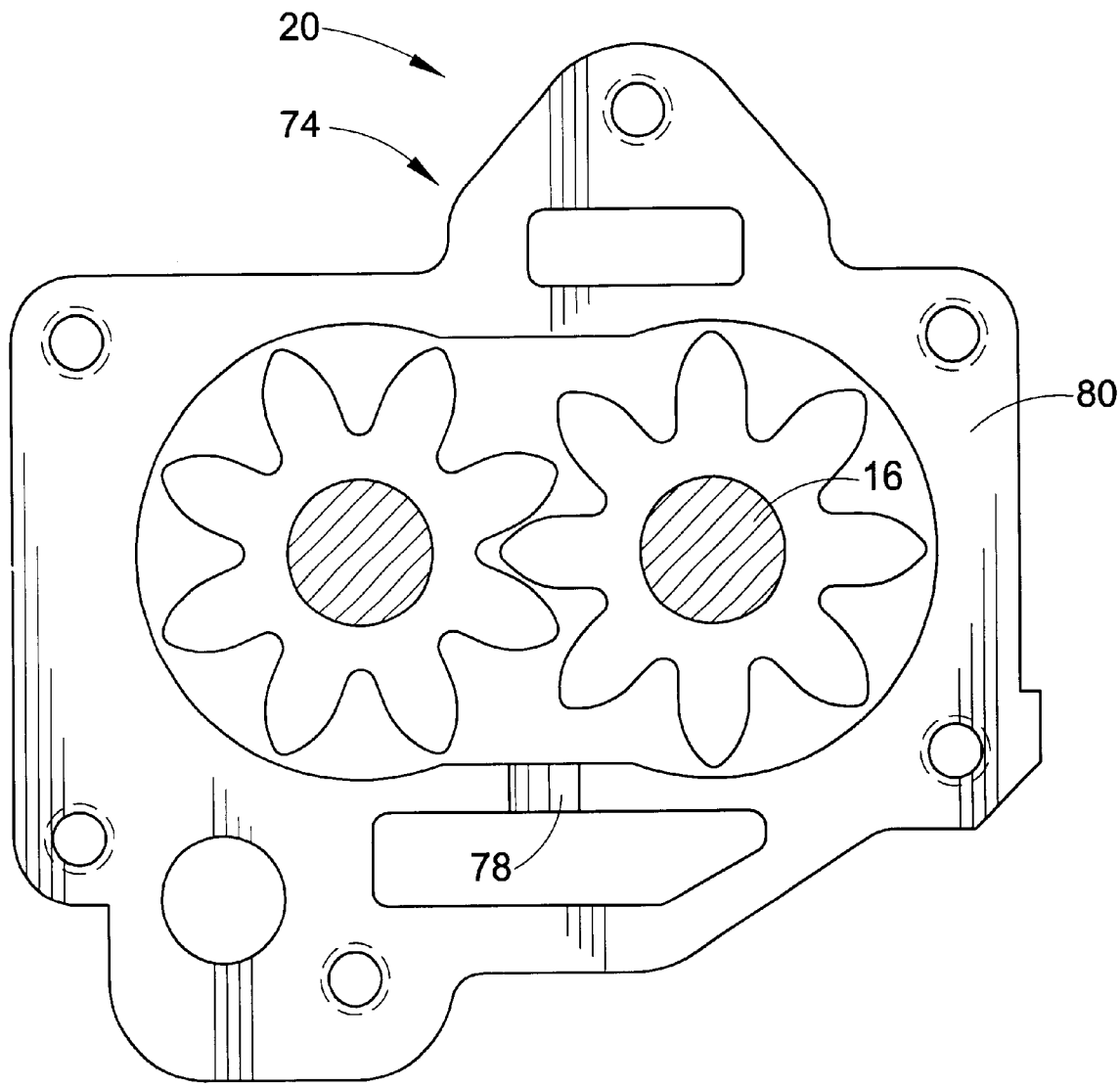
FIG. 5 is a top plan view of a gear pump.

In the exemplary embodiment, the actuator pump 20 is a gerotor pump, shown in FIG. 3. The gerotor pump includes an inner gear and an outer gear. The inner gear is coupled to the transmission shaft 16 and is off-center in a housing 80 of the pump 20. The outer gear meshes with the inner gear. The outer gear is centered in the housing 80 of the pump 20, creating a gap (not shown) between the inner gear and the outer gear at one side of the pump. Rotation of the gears by the transmission shaft 16 creates pressure where the gears mesh to produce a flow of fluid from an outlet 78 of the gerotor pump. In one embodiment of the invention, the gerotor pump produces a flow of fluid out the outlet 78 at a pressure of approximately 45 psi. Since the actuator pump 20 is completely submerged in the hydrostatic fluid 38 in the reservoir 36, it is not necessary for a housing 80 of the actuator pump 20 to be fluid tight. In the exemplary embodiment, the gerotor pump is made from plastic to reduce the cost of the pump. One suitable gerotor pump is included in pump assembly model # AM879668, which is used in Scotts Tractors produced by John Deere. It should be apparent to those skilled in the art that other pumps could be used as the actuator pump 20. For example, a gear pump 74 (shown in FIG. 5) or a vane pump could be used. Some hydrostatic transmissions include a charge pump for replacing hydrostatic fluid in the drive pump. The exemplary transmission could be modified to use the charge pump to provide hydrostatic fluid 38 under pressure to a fluid driven actuator 22.

The outlet 78 of the actuator pump 20 is coupled to the actuator valve 24. In the exemplary embodiment, the actuator valve 24 is a solenoid valve. In an alternate embodiment, a mechanical valve is used. Referring to FIG. 3, application of an electric signal to the solenoid 82 causes the valve 24 to open, thereby communicating hydrostatic fluid 38 under pressure to the fluid driven actuator 22.

Figure 1B:
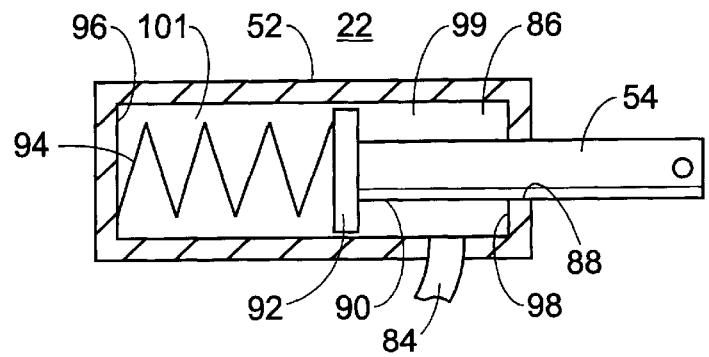
FIG. 1B is an enlarged schematic representation of an actuator shown in an extended position.
Figure 2B:
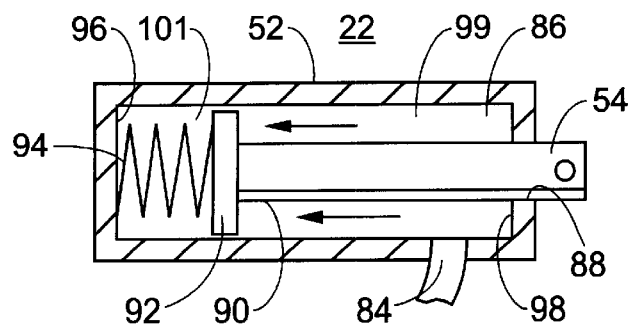
FIG. 2B is an enlarged schematic representation of an actuator shown in a retracted position.

Referring to FIGS. 1A and 1B, the fluid driven actuator 22 is supported within the opening 48 in the upper half 30 of the transmission housing 14 in the exemplary embodiment. In an alternate embodiment, the fluid driven actuator 22 is connected to an outer surface of the transmission housing 14. An inlet 84 into a chamber 86 (shown in FIGS. 1B and 2B) of the fluid driven actuator 22 routes fluid into the chamber based on the state of the actuator valve 24. Referring to FIGS. 1B and 2B, the shaft 54 of the actuator 22 extends through an opening 88 in the body 52 of the actuator into the chamber 86 of the actuator. An internal end 90 of the shaft 54 is connected to a piston head 92. A compression actuator spring 94 is captured between the piston head 92 and an end wall 96 of the chamber 86. The compression actuator spring biases the actuator to an extended position shown in FIG. 1B, when hydrostatic fluid under pressure is not communicated to the actuator.

Figure 4A:
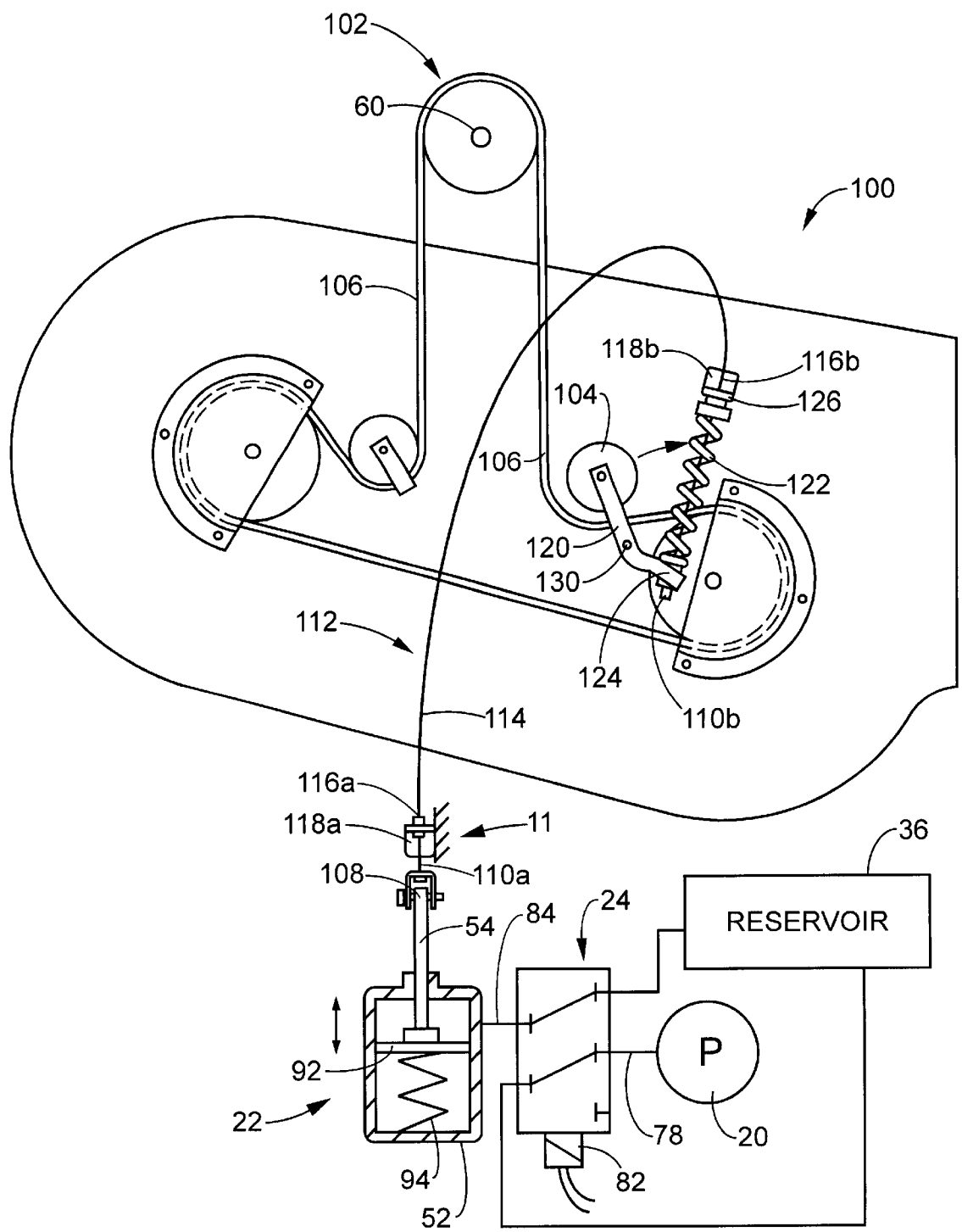
FIG. 4A is a schematic representation of an integral actuator disengaging a power take-off of a lawn and garden tractor.
Figure 4B:
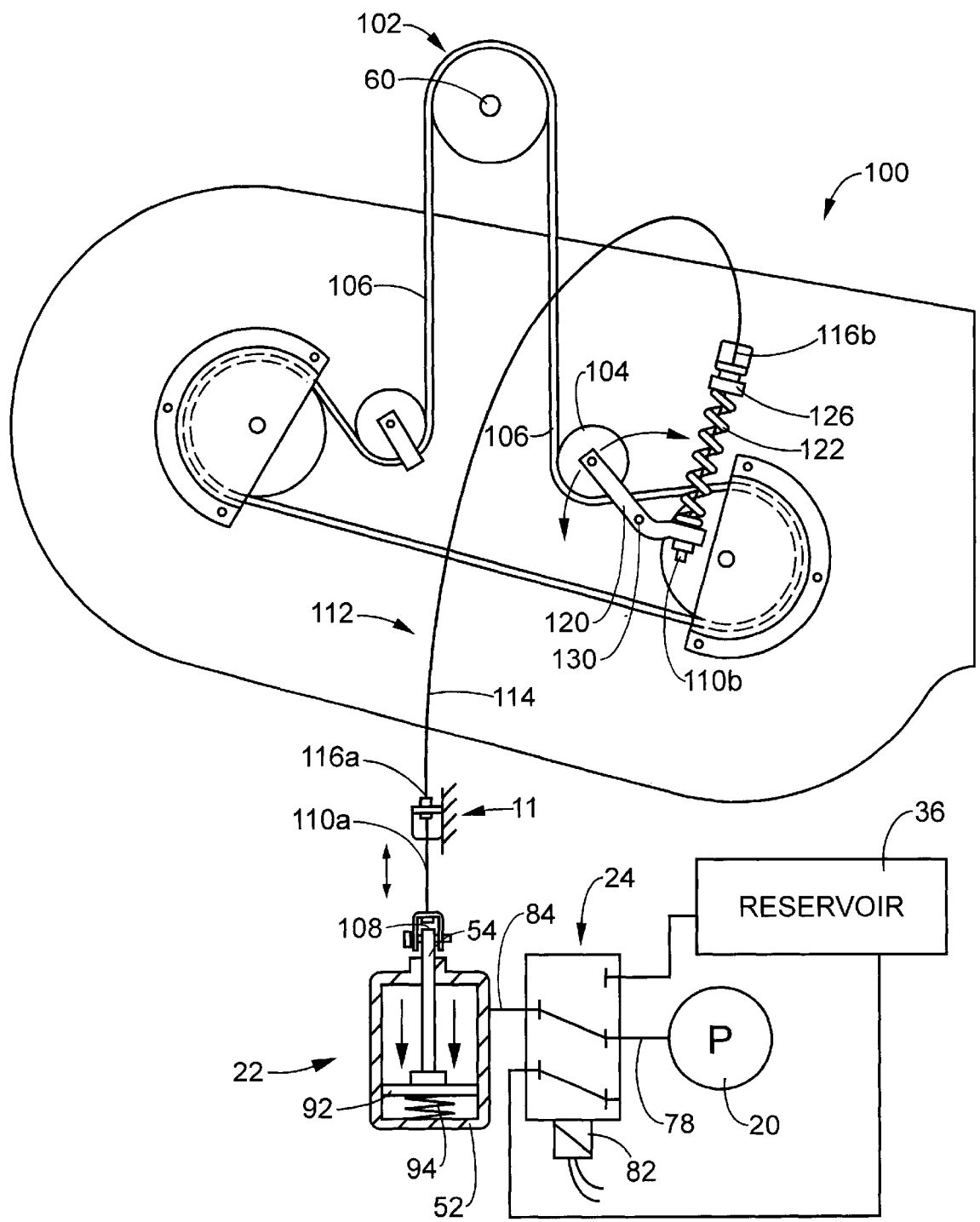
FIG. 4B is a schematic representation of an integral actuator engaging a power take-off of a lawn and garden tractor.
Figure 4C:
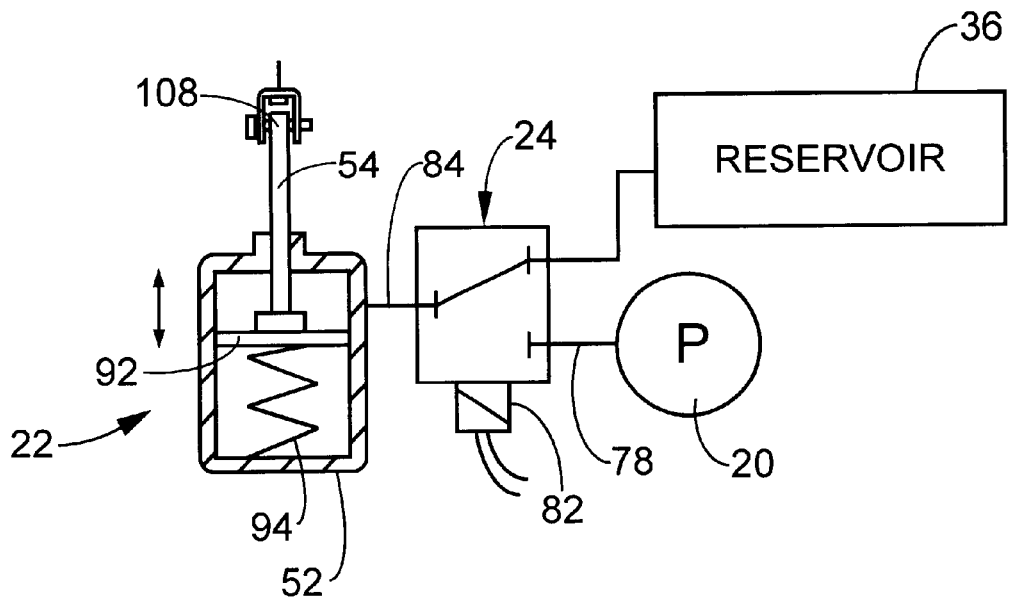
FIG. 4C is a schematic representation of an alternate valve configuration.
Figure 4D:
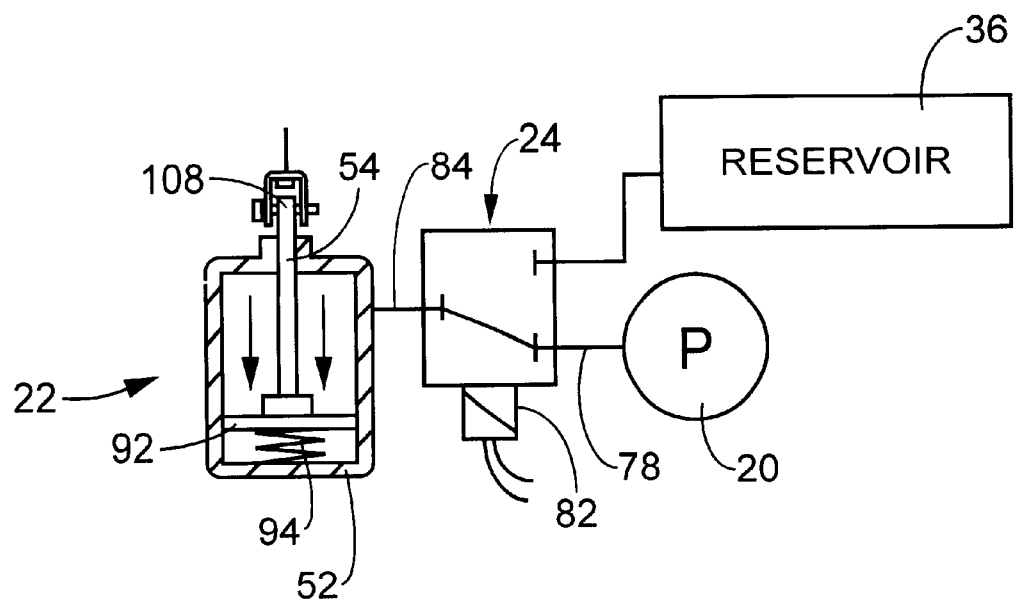
FIG. 4D is a schematic representation of an alternate valve configuration.

Referring to FIGS. 4A and 4B, the valve is a double pole, double throw valve in the exemplary embodiment. In an alternate embodiment shown in FIGS. 4C and 4D, the valve is single pole, double throw where the pump either cavitates or has a relief valve. FIG. 4B schematically shows the valve 24 in an "open" position. In the "open" position, the pump 20 is connected to the inlet 84 of the actuator. When the actuator valve 24 is "open" and hydrostatic fluid 38 under pressure enters a region 99 of the chamber 86 that bounds the shaft 54 in the actuator body 52. The hydrostatic fluid under pressure 38 exerts force against the piston head to retract the shaft 54 against the biasing force of the compression actuator spring 94.

FIG. 4A schematically shows the valve 24 in a "closed" position. In the "closed" position the inlet 84 of the actuator and the actuator pump 20 are connected to the reservoir. When the valve is "closed" hydrostatic fluid under pressure is not communicated to the chamber 86 of the actuator body 52. In the "closed" position, hydrostatic fluid 38 under pressure from the actuator pump 20 is recirculated back into the reservoir 36. The compression actuator spring 94 forces the piston head 92 and actuator shaft to the extended position. The movement of the piston head 92 in the chamber 86 of the actuator body 52 forces hydrostatic fluid 38 out of the inlet 84 of the actuator. The hydrostatic fluid 38 flows through the valve 24, which is open to the reservoir 36 when the valve is in the "closed" position.

Figure 1C:
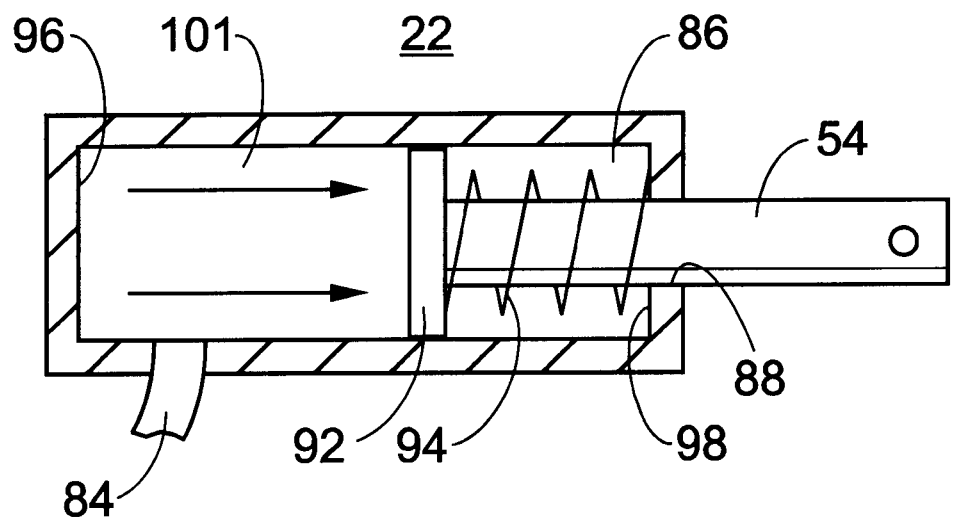
FIG. 1C is an schematic representation of an actuator shown in an extended position.

It should also be apparent to those skilled in the art that the fluid driven actuator can be configured such that supplying hydrostatic fluid under pressure to the actuator 22 will cause the fluid actuator to extend from a normally retracted position. For example, FIGS. 1C and 2C illustrate that the compression actuator spring 94 may be disposed around the shaft 54 of the actuator, between the piston head 92 and the opposite end wall 98 of the chamber 86. The hydrostatic inlet 84 in this embodiment is located near the end wall 96 of the chamber 86. In this embodiment, the spring biases the shaft to a retracted position when the valve 24 is "closed" and hydrostatic fluid 38 under pressure is not supplied to the actuator (FIG. 2C). When the valve is opened, hydrostatic fluid under pressure is supplied to a region 101 of the chamber 86 that does not bound the shaft 54 in the actuator body 52 (FIG. 1C). The fluid under pressure exerts a force on the piston head pushing actuator shaft 54 out the actuator opening 88 against the force of the spring to an extended position.

It should also be apparent to those skilled in the art that an extension spring may be used to bias the actuator. Alternatively, the actuator may include a first inlet coupled to the shaft side 99 of the chamber 86 and a second inlet (not shown) coupled to the piston side 101 of the chamber 86. Regulation of the fluid under pressure to the first and second inlets allows the piston head 92 and actuator shaft to be stopped at various locations between the fully extended position shown in FIG. 1B and the fully retracted position shown in FIG. 2B. Although the exemplary embodiment depicts a linear actuator, it should be readily apparent to those skilled in the art that a rotary actuator may be employed.

In the exemplary embodiment, the integral actuator is selectively extended and retracted by coupling the shaft 16 of the hydrostatic transmission to the shaft 60 of the engine 12. The shaft of the hydrostatic transmission is coupled to the actuator pump 20 to create fluid pressure in the pump. An electrical signal is provided to the solenoid 82 to open the valve 24 to communicate hydrostatic fluid 38 under pressure from the pump 20 to the actuator to retract the actuator. By removing the electrical signal from the solenoid 82, the valve 24 "closes" to stop the flow of hydrostatic fluid 38 under pressure from the actuator pump 20 to the fluid driven actuator. Removal of the electric signal from the solenoid 82 also opens the outlet 78 of the pump 20 and the inlet 84 of the actuator 22 to the reservoir 36, allowing hydrostatic fluid 38 in the chamber 86 in the body 52 of the actuator 22 to evacuate into the reservoir. This allows the actuator to retract very quickly under the biasing force of the compression actuator spring 94.

The integral actuator 22 of the hydrostatic transmission can be used to engage and disengage a variety of implements of a lawn and garden tractor. For example, the integral actuator 22 can be used for engaging blades of a mower deck, engaging a power take-off, adjusting the height of a mower deck, adjusting the angle of a snow plow blade, lifting a snow plow blade, adjusting the blower spout angle of a snow blower, raising a snow blower, power steering, emptying a grass catcher, raising a 3 point hitch and any connected attachments, controlling the speed of the tractor, indicating how full a grass bag is, applying brakes, adjusting the suspension, adjusting the seat, assisting gear shifting and providing an interlock when a mower is in reverse.

By way of example, FIGS. 4A and 4B depict the engagement of a belt 106 of a mower deck 100 to a power take-off 102. The power take off 102 is coupled to the output shaft 60 of the vehicle engine 12. FIG. 4A shows the fluid driven actuator 22 biased by the compression actuator spring 94 to an extended position, allowing slack between an idler pulley 104 and the belt 106. In FIG. 4A, an electrical signal is not being communicated to the solenoid 82, so the valve 24 operably connects the inlet 84 of the fluid driven actuator 22 and the actuator pump 20 to the reservoir 36. Since fluid under pressure is not pressing against the piston head 92, the compression actuator spring 94 biases the actuator shaft 54 to the extended position. An end 108 of the actuator shaft 54 is coupled to an end 110a of a cable 112. A sleeve 114 having two ends 116a, 116b is disposed around most of the length of the cable. The sleeve ends 116a, 116b are connected to anchors 118a, 118b. The anchor 118a is connected to the frame of the vehicle or tractor and the anchor 118b is mechanically fastened to the mower deck 100. The second end 110b of the cable 112 is connected to a pivotable arm 120 that moves the idler pulley 104 into and out of engagement with the belt 106. A compression spring 122 is disposed around the cable end 110b and is "sandwiched" between an end 124 of the pivotable arm 120 and a stop 126.

When the fluid driven actuator 22 is in the extended position shown in FIG. 4A, the compression spring 122, "sandwiched" between the pivotable arm 120 and stop, forces the pivotable arm 120 away from the stop 126 maintaining tension on the cable 112. By pushing the pivotable arm 120 away from the stop 126, the compression spring pivots the idler pulley 104 away from the belt 106 to disengage the belt from the power take-off.

Referring to FIG. 4B, an electric signal is applied to the solenoid 82 to open the actuator valve 24. Fluid pressure is communicated from the actuator pump 20 to the inlet 84 of the fluid driven actuator 22. Fluid under pressure enters the actuator chamber 86 and forces the piston head, against biasing force of the compression actuator spring 94 to retract the shaft 54 of the actuator and the cable 112. As the actuator shaft 54 pulls on the cable 112, the pivotable arm 120 is pulled toward the stop 126 against the force of the idler compression spring 122. The effective length of the compression spring 122 is reduced and the idler pulley 104 is rotated about pivot 130 into engagement with the belt 106. Tight engagement between the idler pulley 104 and the belt 106 effectively couples the mower deck 100 to the power take-off 102.

Although the present invention has been described with a degree of particularity, it is the intent that the invention include all modifications and alterations falling within the spirit and scope of the appended claims.

We claim:

1. A hydrostatic transmission with an integral actuator for a vehicle having an engine and a frame, comprising:
    a) a transmission housing connected to said vehicle frame;
    b) a shaft extending into said transmission housing adapted to be coupled to said engine of said vehicle;
    c) a first pump in said transmission housing operably connected to said shaft, wherein rotation of said shaft produces a flow of fluid from said first pump that is controlled to propel said vehicle;
    d) a second pump in said transmission housing operably connected to said shaft, wherein rotation of said shaft produces a flow of fluid from said second pump;
    e) an actuator at least partially extending from said transmission housing coupled to said second pump; and
    f) a valve operably connected to one of said second pump and said actuator for selectively communicating fluid pressure to said actuator to selectively extend and retract said actuator.

2. The apparatus of claim 1 further comprising a spring operably connected to said actuator that biases said actuator to a first position when said valve is closed.

3. The apparatus of claim 1 wherein said valve is enclosed in said housing.

4. The apparatus of claim 1 wherein said valve comprises a solenoid valve.

5. The apparatus of claim 1 further comprising a spring disposed in a housing of said actuator that biases said actuator to a first position when said valve is closed.

6. A method of selectively extending and retracting an integral actuator contained at least partially within a hydrostatic transmission housing of a vehicle having an engine, comprising:
    a) coupling a shaft of a hydrostatic transmission to an engine;
    b) coupling said shaft of said hydrostatic transmission to a pump to create fluid pressure in said pump; and
    c) selectively communicating said fluid pressure from the pump to said integral actuator to selectively extend and retract a portion of said actuator that extends from said housing.

7. The method of claim 6 further comprising biasing said integral actuator to a first position with a spring.

8. The method of claim 6 wherein said step of selectively communicating pressure comprises opening a valve to communicate fluid pressure from said pump to said integral actuator.

9. The method of claim 8 wherein an electric signal is communicated to said valve to open said valve.

10. The method of claim 6 wherein said integral actuator is extended by communicating fluid pressure to said integral actuator.

11. A method of engaging a PTO shaft comprising:
  a) providing a vehicle having a body, an engine, a hydrostatic transmission including a transmission housing with an integral actuator that extends from said transmission housing and a PTO shaft;
  b) selectively communicating fluid pressure to said integral actuator; and
  c) engaging the PTO shaft by movement of a portion of said actuator that extends from said transmission housing.

12. The method of claim 11 further comprising biasing said integral actuator to a first position with a spring.

13. A control system for controlling a PTO shaft on a riding law mower having an engine, comprising:
  a) a hydrostatic transmission with an integral actuator, said hydrostatic transmission with integral actuator including a housing, a shaft extending into said housing that is coupled to an engine of a vehicle, a first pump in said housing operably connected to said shaft, wherein rotation of said shaft produces a flow of fluid from said first pump that is controlled to propel said vehicle, a second pump in said housing operably connected to said shaft, wherein rotation of said shaft produces a flow of fluid from said second pump, and an actuator at least partially within said housing coupled to said second pump; and
  b) a valve operably connected to one of said second pump and said actuator for selectively communicating fluid pressure to said actuator to selectively move said actuator from a first position to a second position; and
  c) a connector link operably connected to said actuator and said PTO shaft, wherein movement of said actuator from said first position to said second position engages said PTO shaft.

14. The apparatus of claim 13 further comprising a spring that biases said actuator to said first position.

15. The apparatus of claim 13 wherein said valve is enclosed in a housing.

16. The apparatus of claim 13 wherein said valve comprises a solenoid valve.

* * * * *